Figure 1:
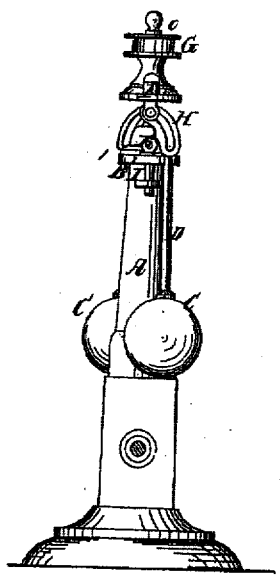

E. H. Knight,
Governor.

N° 59,411.

Patented Nov. 6, 1866.

2 Sheets—Sheet 1

Witnesses:
Geo. T. Jones

Inventor:
Edward H. Knight

E. H. Knight,
Governor.

2 Sheets—Sheet 2.

N° 59,411.

Patented Nov. 6, 1866.

Witnesses:
Geo. T. Jones
Octavius Knight

Inventor:
Edward Knight

UNITED STATES PATENT OFFICE

EDWARD H. KNIGHT, OF WASHINGTON, DISTRICT OF COLUMBIA.

IMPROVEMENT IN GOVERNORS.

Specification forming part of Letters Patent No. 59,411, dated November 6, 1866.

*To all whom it may concern:*

Be it known that I, EDWARD H. KNIGHT, of Washington, in the District of Columbia, United States, have invented a new and useful Improvement in Governors for Steam and other Engines; and I do hereby declare the following to be a full, clear, and exact description of the nature, construction, and operation of the same, sufficient to enable one skilled in the art to which it appertains to construct and use the same, reference being had to the accompanying drawings, which are made part of this specification, and in which similar letters refer to corresponding parts in the different figures.

By my invention I give an automatic adjustment or free motion in a horizontal plane to the axis from which the governor-balls are suspended, so that the balls are permitted to swing with freedom in such a direction as is due to the speed and proportions of the parts.

My governor arms or balls are not confined by guides or by the relative immobility of their hinging-axes to any prescribed path, as in the usual form, where the arms rise in the plane of the axis of rotation of the central shaft, or as in forms where they swing in planes tangential to the circle described by their points of suspension, or as in other forms where they swing in other prescribed paths.

In all these cases the arm, being upon a fixed axis, must (except at a certain speed) bind in some degree against its guides, if it has any, or its bearing will be twisted or laterally strained by compelling the balls to rise in directions which are not coincident with their tendencies under their conditions of speed and proportions. I avoid the extra friction which is due to the compulsory action described, by permitting the balls to swing freely in such curves as their changing velocities incline them to describe; and the vertical rise of the balls, whether the swing of their arms be more or less nearly radial, is equally effective at any given portion of their range of motion upon the plate which is actuated by their vertical motions.

It is desirable that when the governor commences to revolve the balls shall be so suspended as by their inertia to lag behind and swing in a direction nearly tangential to the circle described by their points of suspension, this being about their natural line of initial motion, and any guide or permanent axis which tends to restrain them from this line affects the freedom of their movement, involves additional friction, which interposes and prevents the delicate and instant response to the acceleration or retardation of speed.

When governor-balls are compelled to rise in a certain plane they can only do so with freedom at a definite speed, and their motion on their axes can never be perfectly poised when running at a rate either above or below such definite speed. Now, if the balls be allowed free play, they will of themselves, under an increment of speed, describe a spiral of increasing diameter, and conversely, and inasmuch as they tend outwardly, they increase the diameter of the path described under increasing speed, thus making their arms more and more nearly radial to the axis of revolution. Any detention in a prescribed plane of motion relatively to the axis involves friction and loss of sensitiveness.

By my invention the balls are free to swing in such a direction as may be induced by their speed and proportions, ascending or descending under changes of speed in such curves as may result from the combined forces of gravity and centrifugal impulse under the conditions of free pivotal attachment to points on a horizontally rotating plane.

The design is to make the balls promptly responsive to every accession or diminution of impelling force, and I find that the inertia of the balls developed by the accession of speed and demonstrated by their tendency to lag behind is much more immediately responsive and active than the tendency to assume a more radial relative position. To be effective at all requires that the balls shall rise; but their effect, due to their inertia under a sudden quickening of the impulse, is much more immediately responsive than the outward or more radial position which soon ensues.

Figure 2:
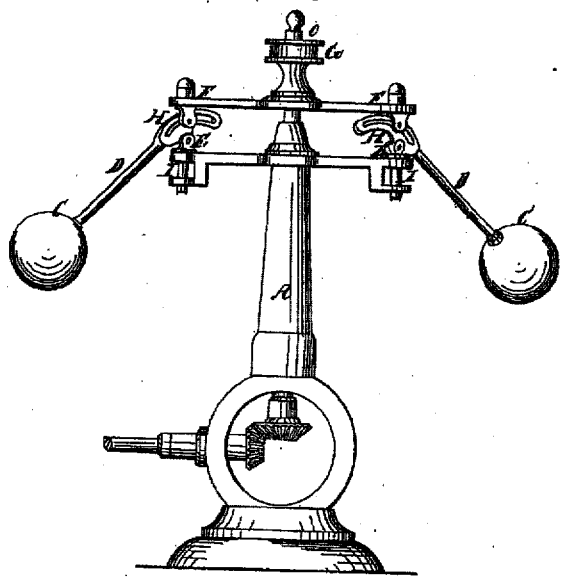
Figure 3:
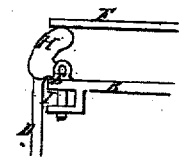
Figure 8:
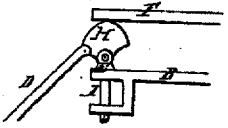
Figure 9:
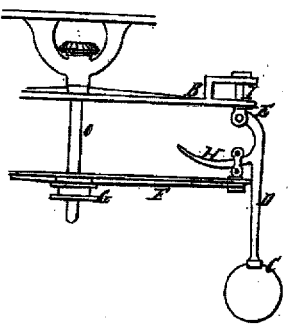
Figure 5:
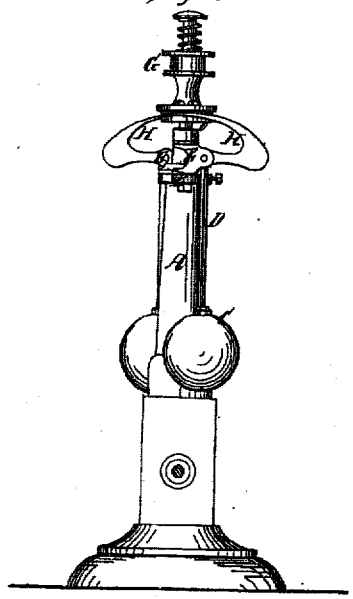
Figure 6:
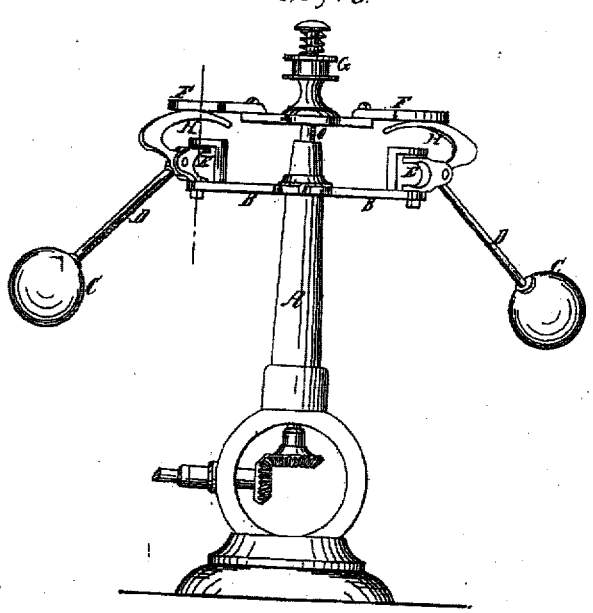
Figure 4:
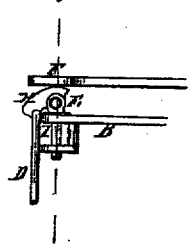
Figure 7:
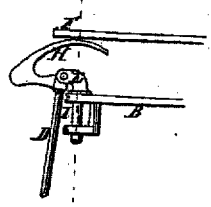

Figures 1 and 2 are elevations from different points of view of my governor, so arranged as to depress and elevate the upper plate, the depression and elevation of the plate and the sheave above it being positive motions derived from the vertical movements of the ball. Fig. 3 is a detached view of one curved toe, with a portion of the plate on which it is pivoted and journaled, and also of the one above it. In this modification the upper plate is depressed by a spring, assisted by its own gravity, when by the rising of the ball the curved toe is rotated in a vertical plane, the return motion or lifting of the plate being accomplished by the depression of the governor-balls. Fig. 4 is a detached view of a modification, differing from Fig. 3 in this respect only, that the rising of the ball elevates the plate which rests upon the curved toe, the return motion being made by the gravity of the plate, assisted by a spring, if necessary. Figs. 5 and 6 are elevations from two different points of view of a modification in which the carriage, from which the ball is suspended, is supported by bearings above and below, the curved toe spanning the bracket which forms the upper bearing. Fig. 7 shows a detached portion of a modification, in which the supporting-bracket extends below the plate, instead of above it. This form differs from Figs. 5 and 6 in this respect: In Fig. 6 the carriage is supported by pivots or bearings above and below; in Fig. 7, by an extended bearing below. In the former case the curved toe is required to span the carriage and supporting-bracket; in the latter case it spans the carriage only. In the former case an advantage is derived from the mode of supporting; in the latter case an advantage may arise from diminishing the length of the toe. Fig. 8 is an illustration of a peculiar form of toe, arranged to allow the upper plate to drop by the vertical motion of the balls in either direction from a given vertical position. The object of this figure is to illustrate the fact that the toe may be made of such a form as to drop the plate by a vertical motion either above or below a certain point. Fig. 9 shows a modification, possessing the same general characteristics as the other figures in respect of the revolution in a horizontal plane of the axis from which the governor arms and balls are suspended, but differing from the former figures in this respect, that the curved toe, spur, or cam is below the axis of oscillation of the governor-arm, which may somewhat facilitate the suspension of the governor from the ceiling or from a point above, rather than upon a post or other sub-support.

Figure 10:

In Fig 10 a spur or finger, V, from above the hinging-joint of the governor-arm projects upward, and is jointed to a link, P, pivoted above to a spindle, I, in the plate F. The finger V and link P together form a toggle, and the upward motion of the ball bends the toggle and brings the plate F nearer to the plate B, the two ends of the toggle being hinged in bearings which are capable of horizontal rotation in the respective plates F B. The downward motion of the ball restores the normal position.

The parts may be so arranged as to straighten the toggle by the raising of the ball, if so desired. A different effect in the graduation of the movement of the ball will be thereby produced.

In the drawings: A represents a standard or post which supports the revolving portion of the governor. B is the plate from which the balls C are suspended by the arms D. The latter have their bearings in the carriages E, which are pivoted in the plate B.

Under the required impulse the ball C rises vertically, vibrating on its horizontal bearings in the carriage, while it can move horizontally by the rotation of its supporting-carriage in a horizontal plane on its vertical bearing in the plate B. The motion of the ball under an increment or diminution of speed will call into play both these adjustments, as the ball will ascend or descend in curves of increasing or decreasing radii.

It is this freedom of motion which forms the distinguishing characteristic of my governor, as the balls are not compelled to follow any particular track by guides or by bearings which have no horizontal adjustment under impulses which tend in that direction. This general characteristic of freedom of motion is maintained in all the illustrations hereto annexed, while certain modifications of detail are apparent in the different figures.

Attached to the arms of the governor-balls are cams, toes, or tappets H, which move with the vertical motion of the balls irrespective of the actual position of the carriages E in the plane of their horizontal adjustment.

It is preferred, as in Figs. 3, 4, 8, 9, that a vertical line through the axis of the carriage E shall strike the line of the axes of suspension of the arms D, and also the point where the cam H touches the plate F, or, as in Figs. 1 and 2, when the cam engages with the pivoted pin depending from the plate F. In these latter figures the vertical axes of the carriage E and swiveled pin I are coincident, and intersect the axis of the pin which traverses in the slot of the cam H and the axis upon which the governor-ball arms are hinged or pivoted.

In Figs. 5, 6, and 7 the axis of vibration of the ball-arms is somewhat on one side of the vertical line of the axis of horizontal vibration; but the same principle is retained of vibration on the horizontal axis, to permit the balls to swing according to their tendency under the conditions of speed and proportions.

In Figs. 1, 2, and 3 it will be perceived that the rising of the balls causes the downward motion of the plate F, to which the sheave G is attached, while in the other figures (except Fig. 8) the rising of the governor-balls has the effect of raising the plate F. This variation is an optional feature, the respective values of the two plans varying, perhaps, with different circumstances.

In Figs. 1 and 2 it may also be observed that the upward and downward motions of the plate F are both caused by the direct action of the balls as they fall or rise.

The carriage E and swiveled pin I are each easily rotated in a horizontal plane, so as to permit the formerly-described motions of the balls. The cam H in these figures has a slot of the required curve relatively to the axis upon which it turns, so as to raise or drop the plate a given distance with a given vertical motion of the balls, more or less, and in such proportions as may be proper for the purpose designed.

The means by which the governor is driven is not material. I have shown a pair of bevel cog-wheels which run the vertical shaft O, on which the plate B is fastened, so as to be revolved with said shaft O. Attached by a feather to the said shaft, but with a vertical adjustability, is the plate F, which rises and falls as actuated by the governor-balls. A sheave or gland, G, is attached to plate F, and revolves therewith, and upon this sheave the arms of a rod may be placed, so that the vertical movement of the plate may be communicated to an arm, lever, or other mechanical device or means of transmitting motion to the throttle or other valve for regulating the sectional area of steam-opening or other analogous adjustment.

Having described my improvement, what I claim therein as new, and desire to secure by Letters Patent, is—

A governor having its balls or weights so supported as to afford automatic adjustment or free motion in a horizontal plane to the axes upon which the balls swing.

EDWARD H. KNIGHT.

Witnesses:
GEO. T. JONES,
OCTAVIUS KNIGHT.